(12) United States Patent
Girard

(10) Patent No.: US 7,656,540 B2
(45) Date of Patent: Feb. 2, 2010

(54) APPARATUS AND METHOD FOR MEASURING SUSPENSION AND HEAD ASSEMBLIES

(75) Inventor: Mark T. Girard, Hutchinson, MN (US)

(73) Assignee: Applied Kiietics, Inc., Hutchinson, MN (US)

(*) Notice: Subject to any disclaimer, the term of this patent is extended or adjusted under 35 U.S.C. 154(b) by 28 days.

(21) Appl. No.: 11/634,813

(22) Filed: Dec. 6, 2006

(65) Prior Publication Data

US 2008/0137070 A1 Jun. 12, 2008

(51) Int. Cl.
*G01B 11/14* (2006.01)
(52) U.S. Cl. ........................... 356/622; 356/614
(58) Field of Classification Search .......... 356/622–644
See application file for complete search history.

(56) References Cited

U.S. PATENT DOCUMENTS

| | | | |
|---|---|---|---|
| 5,636,013 A | | 6/1997 | Swift |
| 5,673,110 A | * | 9/1997 | Erickson et al. ............. 356/507 |
| 5,777,745 A | * | 7/1998 | Zeng et al. .................. 356/623 |
| 6,421,124 B1 | * | 7/2002 | Matsumoto et al. ......... 356/401 |
| 6,542,251 B2 | * | 4/2003 | Mueller-Rentz ............. 356/614 |
| 7,027,141 B2 | | 4/2006 | Girard et al. |
| 2006/0072381 A1 | | 4/2006 | Girard |

* cited by examiner

*Primary Examiner*—Michael P Stafira
(74) *Attorney, Agent, or Firm*—Kagan Binder, PLLC

(57) ABSTRACT

An optical measurement device for determining at least two parameters of a measurement location of a surface of a workpiece positioned in a known coordinate system by a workpiece support is described. The device comprises a first light source providing a first measurement beam at a first wavelength and a second light source providing a second measurement beam at a second wavelength. The device also comprises a beam steering system positioning the first and second measurement beams to be collocated on the surface of the workpiece. Further, the device comprise a first imaging system, detecting the incoming position of the first measurement beam and an optical receiving system, detecting the incoming position of the second measurement beam.

19 Claims, 7 Drawing Sheets

APPARATUS AND METHOD FOR MEASURING SUSPENSION AND HEAD ASSEMBLIES

BACKGROUND

The present invention relates to apparatuses and methods for determining spatial information of a workpiece surface positioned in a predetermined coordinate system. More particularly, the present invention relates to apparatuses and methods for determining spatial information of surfaces of head suspensions or head suspension assemblies such as those that are generally utilized in dynamic storage devices such as magnetic disk drives.

Components of many electronic, electro-mechanical, and optical devices and systems need to be assembled with precise alignment to assure optimal performance. In the case of certain magnetic recording disk drives, for example, a read/write head needs to be carefully positioned with respect to a surface of a disk during use to assure optimum performance and to avoid crashing the head into the disk and causing damage.

Magnetic disk drives that utilize a head assembly for reading and/or writing data on a rotatable magnetic disk are well known in the art. In such drives, the head assembly is typically attached to an actuator arm by a head suspension assembly. A head suspension assembly includes a head suspension and an aerodynamically designed slider onto which a read/write head is provided so that the head assembly can be positioned very close to the disk surface. Such a head position during usage, that is, where the head is positioned over a spinning disk, is defined by balancing a lift force caused by an air bearing that spins with the disk acting upon the aerodynamically designed slider and an opposite bias force of the head suspension. As such, the slider and head fly over the spinning disk at precisely determined heights.

Head suspensions generally include an elongated load beam with a gimbal flexure located at a distal end of the load beam and a base plate or other mounting means at a proximal end of the load beam. According to a typical head suspension construction, the gimbal flexure comprises a platform or tongue suspended by spring or gimbal arms. The slider is mounted to the tongue thereby forming a head suspension assembly. The slider includes a read/write magnetic transducer provided on the slider and the slider is aerodynamically shaped to use an air bearing generated by a spinning disk to produce a lift force. During operation of such a disk drive, the gimbal arms permit the slider to pitch and roll about a load dimple or load point of the load beam, thereby allowing the slider to follow the disk surface even as such may fluctuate.

The head slider is precisely mounted to the flexure or slider mounting tongue of a head suspension at a specific orientation so as to fly at a predetermined relationship to the plane of the disk surface. During manufacturing and assembling of the head suspension assembly, any lack of precision in forming or assembling the individual components can contribute to a deviation in the desired relationship of the surfaces of these components. A buildup of such deviations from tolerance limits and other parameters in the individual components can cause a buildup of deviation from the desired relationship of the head slider to the associated disk surface in the complete head suspension assembly. The parameters of static roll attitude and static pitch attitude in the head suspension assembly generally result from these inherent manufacturing and assembly tolerance buildups.

Ideally, for optimum operation of a disk drive as a whole, during assembly of a head slider to a slider mounting tongue, the plane of a load beam mounting surface datum and the plane of a head slider surface datum should be in a predetermined relationship to each other. The load beam mounting surface datum and the slider surface datum are usually planar surfaces that are used as reference points or surfaces in establishing the relationship of the plane of an actuator mounting surface and the plane of the surface of the head slider surface relative to each other. The upper and lower planar surfaces of the head slider are also manufactured according to specifications usually requiring them to be essentially or nominally parallel to each other.

In practice, several optical methods can be used to measure the angle of component surfaces, such as laser triangulation or interferometry. Another optical method that can be used is known as autocollimation. An autocollimator is able to measure small surface angles with very high sensitivity. Light is passed through a lens where it is collimated prior to exiting the instrument. The collimated light is then directed toward a surface, the angle of which is to be determined. After being reflected by the surface to be measured, light enters the autocollimator and is focused by the lens. Angular deviation of the surface from normal to the collimated light will cause the returned light to be laterally displaced with respect to a measurement device such as a position sensing device. This lateral displacement is generally proportional to the angle of the surface and the focal length of the lens. An advantage of such a device is that the angle measurement is independent of the working distance of the lens or the distance between the instrument and the component being measured. However, one limitation of this type of device is that it is difficult to use and to measure poorly reflective or non-reflective surfaces.

In the case of measuring the angle of a surface for receiving a slider, accurate information for the mounting or attachment area of the surface is desired. In typical autocollimator based static attitude measurement, the angular information for the mounting area is provided as an average angle for the mounting area. In certain cases, however, it may be desirable to measure the angle of more specific or distinct location of the mounting area such as if the mounting area has small or localized high points on the surface. Such localized high points could affect the angle of a slider mounted to the surface.

SUMMARY

The present invention provides apparatuses and methods for determining spatial information of a workpiece surface positioned in a predetermined coordinate system. For example, apparatuses and methods of the present invention can be used to determine one or more coordinates of one or more measurement locations of a workpiece within a predetermined coordinate system. Such coordinates can be used to define points, lines, and/or surfaces of the workpiece within the coordinate system. In one exemplary application, apparatuses and methods of the present invention can be used to determine spatial information of surfaces of head suspensions or head suspension assemblies such as those that are generally utilized in dynamic storage devices such as magnetic disk drives. Such spatial information can be used to determine z-height and/or static attitude, for example.

In accordance with one exemplary embodiment, an optical measurement device for determining at least two parameters of a measurement location of a surface of a workpiece positioned in a known coordinate system by a workpiece support is described. The device comprises a first light source providing a first measurement beam at a first wavelength and a second light source providing a second measurement beam at a second wavelength. The device also comprises a beam steering system positioning the first and second measurement beams to be collocated on the surface of the workpiece and substantially normally incident on the workpiece. Further, the device comprise a first imaging system, detecting the incoming position of the first measurement beam and an optical receiving system, detecting the incoming position of the second measurement beam.

In accordance with another exemplary embodiment, a method of determining at least two parameters of a measurement location of a surface of a workpiece positioned in a known coordinate system by a workpiece support is described. The method comprises providing a first measurement beam at a first wavelength and providing a second measurement beam at a second wavelength. The method also comprises positioning the first and second measurement beams to be collocated on the surface of the workpiece and the first and second measurement beams impinging on the surface of the workpiece at substantially the same angle. Further, the method comprises detecting the incoming position of the first measurement beam and detecting the incoming position of the second measurement beam.

In accordance with yet another exemplary embodiment, an optical measurement device for determining at least two parameters of a measurement location of a surface of a workpiece positioned in a known coordinate system by a workpiece support is described. The device comprises a means for providing a first measurement beam at a first wavelength and a means for providing a second measurement beam at a second wavelength. The method also comprises a means for positioning the first and second measurement beams to be collocated on the surface of the workpiece. The device further comprises a means for detecting the incoming position of the first measurement beam and a means for detecting the incoming position of the second measurement beam.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
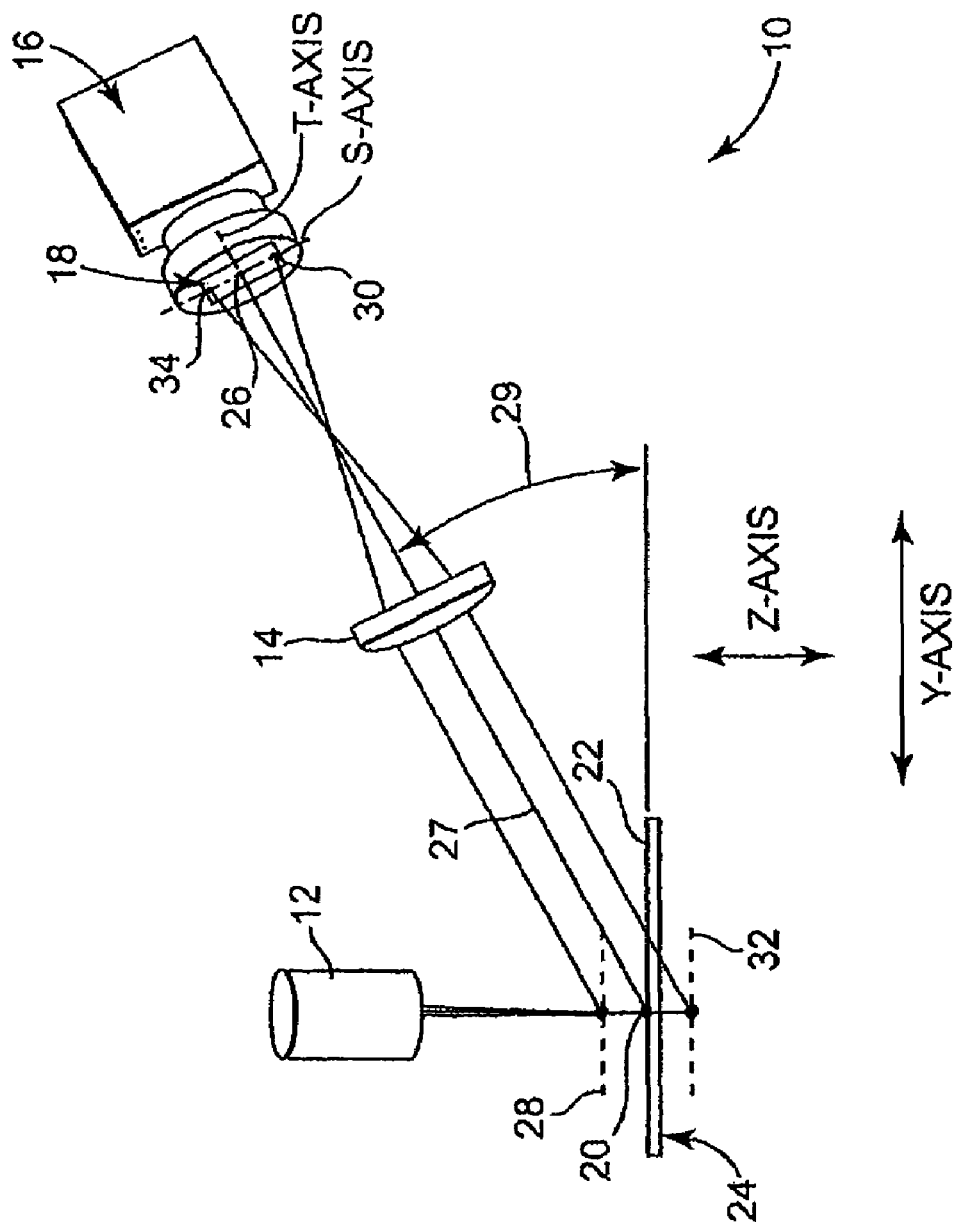
FIG. 1 is a schematic view of an optical triangulation system positioned relative to an x-y-z coordinate system and having a light source, image lens, and a camera and showing in particular how the optical triangulation system can be setup to provide a z-coordinate of an illuminated measurement location on a workpiece surface.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Triangulation techniques can be used to establish the distance between two points or the relative position of two or more points. Triangulation relies on geometry and the knowledge of certain distances and/or angles to determine the position of a point, such as the position of the point in a predetermined coordinate system. Optical systems that use triangulation are known. One type of optical system that uses triangulation is known as a point range sensor and is used to determine the distance between the sensor and a target object. Other optical systems that use triangulation are known. However, one limitation of these systems is that only two coordinates of a point located in a three coordinate system can be resolved as described in greater detail below.

An optical triangulation system 10 is schematically shown in FIG. 1. The triangulation system 10 includes a light source 12, an imaging lens 14, and a camera 16 having a position sensing detector 18. The position sensing detector 18 is an important component of the triangulation system 10 and can sense light that is impinging on the detector 18. The detector 18 can also provide positional information related to where the light is impinging on the detector 18. For example, one type of device that can be used as the position sensing detector 18 is a charge coupled device or CCD. These devices are conventionally known and a typical CCD includes a semiconductor device that has an array of light sensitive elements. The individual light sensitive elements of the array of light sensitive elements are provided in a known geometric arrangement relative to each other. This type of device can be setup to relate the position of light impinging on the array of light sensitive elements with the position of the source of light on a reference surface. Generally, such setup relies on knowledge of the geometry of the system in which the CCD is used, such as the relative positions of the array of light sensitive elements and the reference surface, for example.

In order to setup the triangulation system 10, the light source 12, which is typically a laser, illuminates a focused spot 20 on a surface 22 of a workpiece 24. The surface 22 is positioned relative to an x-y-z coordinate system. For example, the surface 22 is preferably coplanar with an x-y plane of the x-y-z coordinate system. As shown, the light source 12 is normally incident to the surface 22. Alternatively, the light source 12 can be projected onto the surface 22 at an angle, however, at an angle other than 90 degrees the spot 20 may translate across the surface 22 as the surface 22 moves in the z-direction (during setup, for example). This generally, makes it more difficult to perform the calculations required to setup the system as it adds an additional factor that needs to be accounted for. As such, a normally incident light source is preferred.

An image 26 of the illuminated spot 20 is thus seen by the detector 18 as viewed along a viewing direction 27 that makes an angle 29 with the surface 22. As the surface 22 is moved in the z-direction, the spot 20 also moves in the z-direction and, as a result, the image 26 is seen to move along the s-axis of the detector 18 in a manner proportional to the movement of the spot 20 in the z-direction. For example, if the surface 22 is moved by a known distance from a known position, as shown, to the location of the broken line indicated by reference numeral 28, image 26 will move along the s-axis of the detector 18 by distance that is proportional to the distance that the surface 22 is moved. As such, the detector 18 will see the image identified by reference numeral 30. Because the detector 18 can sense the position of light impinging on it, the distance (as defined by the array of light sensitive elements of the detector 18, for example) between the image 26 and the image 30 can be used to define a correlation between the distance that the surface 22 has been moved from its initial position and the distance between the image 26 and the image 30 on the detector 18. Likewise, if the surface 22 is moved by a known distance from a known position, as shown, (in an opposite direction) to the location of the broken line indicated by reference numeral 32, the image 26 will move along the s-axis of the detector 18 by a distance that is proportional to the distance that the surface 22 is moved. Here, the detector 18 will see the image identified by reference numeral 34 and a similar setup approach can be used. When the triangulation system 10 is setup in this manner, the z-coordinate of an illuminated spot on the surface 22 of the workpiece 24 can be determined in an x-y-z coordinate system.

Figure 2:
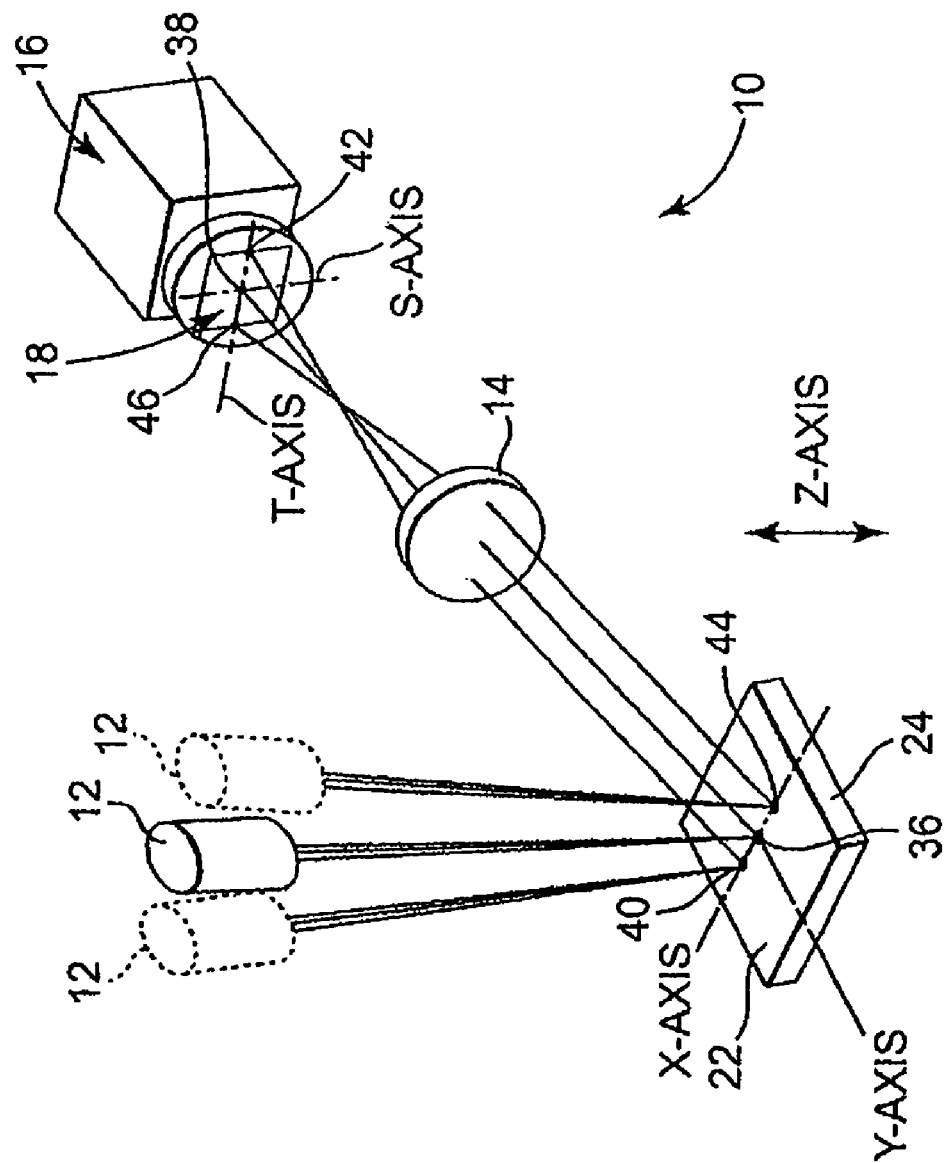
FIG. 2 is schematic view of the optical triangulation system of FIG. 1 showing in particular how the optical triangulation system can be setup to provide a x-coordinate of an illuminated measurement location on a workpiece surface.

The detector 18 also includes a t-axis that is perpendicular to the s-axis, as illustrated, and positional information along the t-axis of the detector 18 can also be obtained for determining an x-coordinate of an illuminated spot on the surface 22 of the workpiece 24. In particular, the t-axis can be setup in a manner similar to that described above. Referring to FIG. 2, the triangulation system 10 is shown wherein the light source 12 illuminates a spot 36 on the surface 22. The detector 18 thus sees an image 38 of the spot 36. For setup purposes, an illuminated spot 40 can be provided on the surface 22. This can be done by moving the light source 12 along the x-axis as shown, providing one or more additional light sources, or by scanning or otherwise redirecting a beam from one or more light sources. As such, the detector 18 sees an image 42 of the spot 40. The light source 12 can also be moved in the opposite direction to provide an illuminated spot 44 on the surface 22, and the detector 18 thus sees an image 46 of the spot 40. The illuminated spot 40 and/or the illuminated spot 44 (or any additional illuminated spots) can be used to define a positional correlation between the x-axis of the coordinate system and the t-axis of the detector 18. As such, when properly setup, the x-coordinate of an illuminated spot on the surface 22 of the workpiece 24 can be determined.

When setup as above (with respect to FIGS. 1 and 2), the triangulation system 10 cannot definitively determine the y-coordinate of an illuminated spot on the surface 22 of the workpiece 24 unless other factors are eliminated or known such as by holding the surface 22 constant in the z-direction. This is because the detector 18 cannot distinguish between a change in the position of an illuminated spot along the z-axis from a change in the position of the illuminated spot along the y-axis. More specifically, a change in the position of an illuminated spot along the z-axis results in a corresponding movement of the image of the illuminated spot along the s-axis of the detector 18. A change in the position of the illuminated spot along the y-axis also results in a corresponding movement of the image of the illuminated spot along the s-axis of the detector 18. Because of this, the detector 18 cannot distinguish between such a change in position of an illuminated spot in the y-axis and the z-axis.

Figure 3:
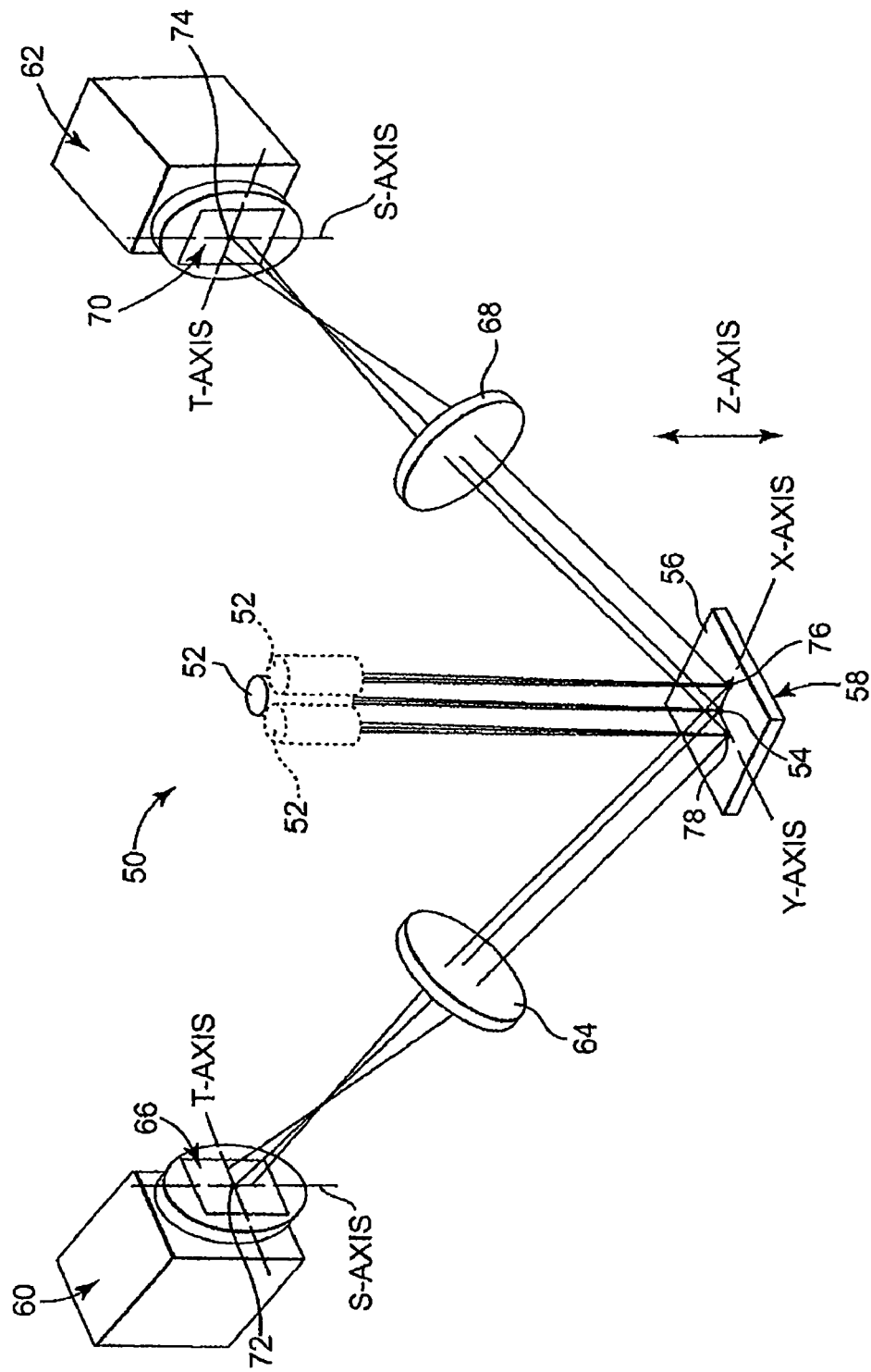
FIG. 3 is a schematic view of an optical measurement device positioned relative to an x-y-z coordinate system and having first and second cameras, first and second imaging lenses, respectively, and a light source that can provide at least one illuminated measurement location on a surface of a workpiece.

In accordance with other exemplary systems, the problem of being able to determine two dimensions by viewing an illuminated spot from different locations has been addressed. For example, an exemplary optical measurement system 50 is depicted schematically in FIG. 3. The measurement system 50, as shown, includes a light source 52, which preferably includes a laser that can illuminate a focused spot 54 on a surface 56 of a workpiece 58. Preferably, the illuminated spot 54 can be viewed from different locations (along different viewing paths, for example) by using first and second cameras 60 and 62, as shown. A single camera may be used that moves between different predetermined or known viewing positions. Moreover, a camera can be stationary while the optical path moves. The first camera 60 includes an imaging lens 64 that can provide an image 72 of the illuminated spot 54 on to a detector 66 of the first camera 60. Similarly, the second camera 62 includes an imaging lens 68 that can provide an image 74 of the illuminated spot 54 onto the detector 70 of the second camera 62.

In the system 50, the first camera 60 can be setup in the z-direction by moving the surface 56 of the workpiece 58 along the z-axis thereby moving an image of the spot 54 on the s-axis of the detector 66. The first camera 60 can also be setup in the y-direction by providing an illuminated spot 76 on the surface 56 that is spaced from the spot 54 at a known distance along the y-axis as illustrated (such as by moving the light source 52 as shown, for example). The y-direction setup can be made by correlating the distance between an image of the spot 54 on the detector 66 and an image of the spot 76 on the detector 66 to the distance between the spot 54 and 56. One problem with this setup, however, is that the first camera 60, by itself, cannot resolve the z and x axes as both appear as a movement in the s-axis of detector 66 during such a setup procedure. Moreover, when the second camera 62 is setup in the same way, the second camera 62, by itself, cannot resolve the z and y axes as both also appear as a movement in the s-axis of the detector 74 during setup. In any case, the first camera 60 can resolve y and the second camera 62 can resolve x.

However, by using information from the first and second cameras 60 and 62, and information including the geometry of the system 50, the x, y, and z axes can be resolved by using known triangulation and mathematical techniques. More specifically, the viewing directions of the first and second cameras 60 and 62 are each provided at a predetermined known angle to the surface 56 of the workpiece 58 (when used as a reference surface for setup purposes). The viewing directions are also preferably orthogonal to each other but may be provided at any desired angle (an angle of 90 degrees generally simplifies the mathematics required for resolving the x, y, and z axes). Also, distances between setup spots on the surface 56 and the detectors 66 and 74 can be measured and used to setup the system 50. By using this type of setup procedure, four known parameters about an illuminated spot on the surface 56 (information from the s and t axes from each of the cameras 60 and 62) along with the geometry of the system 50 can be used to resolve three unknown parameters (x, y, and z coordinates of the spot).

Accordingly, the measurement system 50 can provide the x, y, and z coordinates for one or more illuminated spots on a surface of a workpiece. This coordinate information can be used to determine points, lines, and planes related to a workpiece in a predetermined coordinate system.

Figure 4:
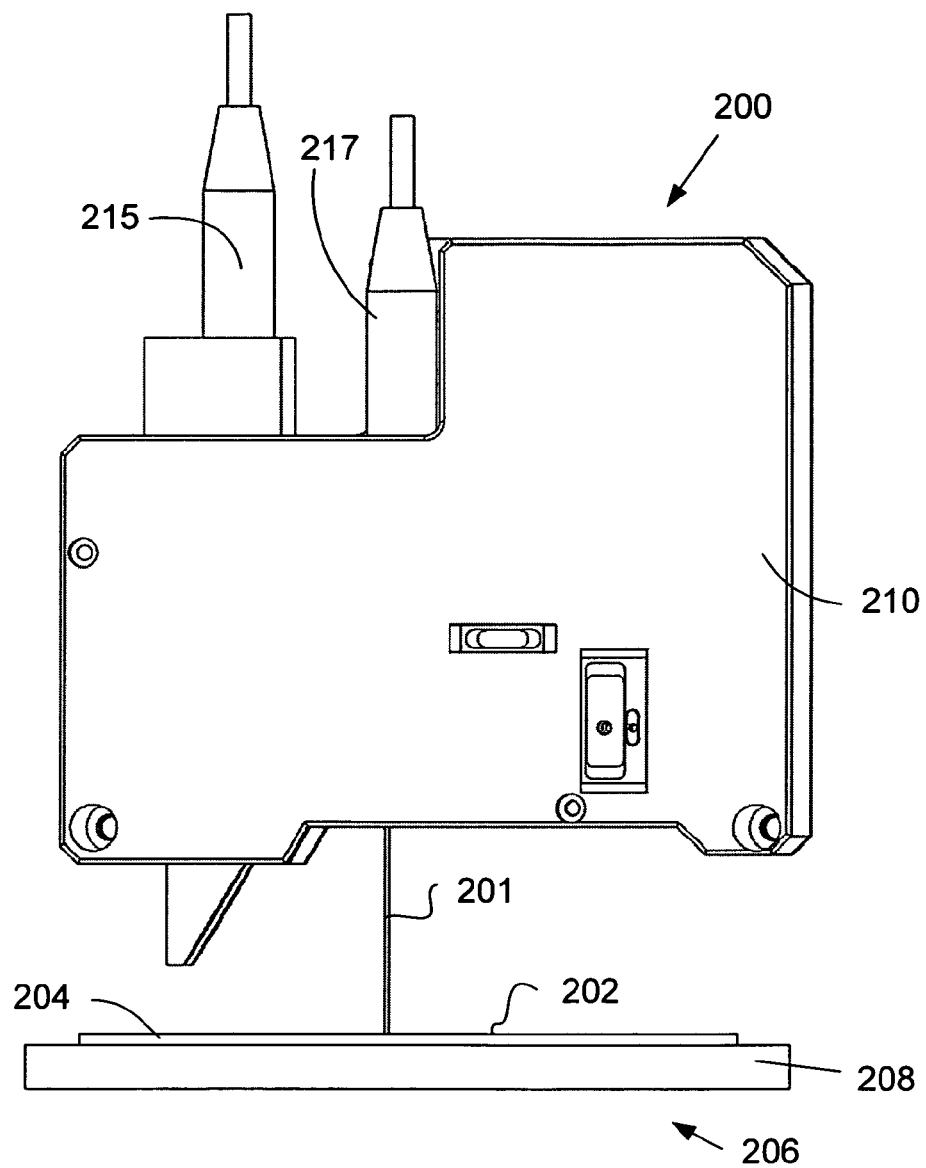
FIG. 4 is a plan view of an exemplary embodiment of an optical measurement device having collocated measurement beams.
Figure 5:
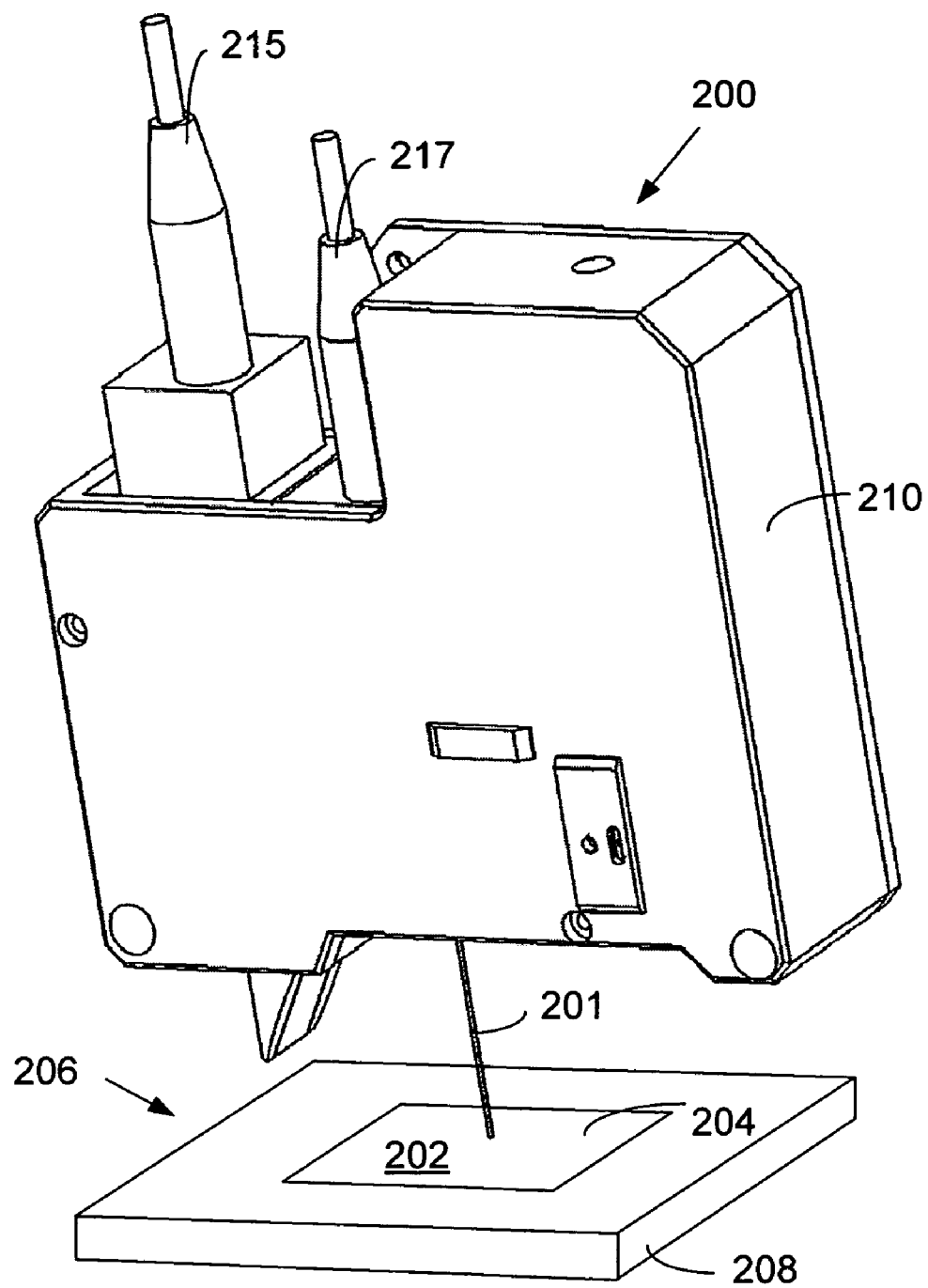
FIG. 5 is a perspective view of the optical measurement device of FIG. 4 having collocated measurement beams.

Referring to FIGS. 4 and 5, an exemplary embodiment of a measurement device 200 in accordance with the invention is illustrated. As described in more detail below, measurement device 200 may be used to measure the angular orientation as well as relative positional information of a surface 202 of a component 204 within a predetermined coordinate system. As schematically shown, component 204 is positioned in a measurement position 206 relative to the device 200 as supported by a workpiece holder 208.

In accordance with an exemplary embodiment, component 202 may comprise a head suspension or a head suspension assembly such as those used for dynamic storage devices and the like. Such head suspensions and head suspension assemblies are well-known and important functional parameters have been developed to ensure proper head position within dynamic storage devices. For example, Applicant's copending non-provisional patent application, "Apparatuses and Methods for Laser Processing of Head Suspension Components," filed on Sep. 13, 2004 by Mark T. Girard and having application Ser. No. 10/940,160 describes such heads suspensions and head suspension assemblies and is incorporated by reference herein. As such, static attitude (both roll static attitude and pitch static attitude) as well as z-height of a head suspension or head suspension assembly can be measured in accordance with an exemplary embodiment. However, it is noted that any head suspension or head suspension assembly or similar component having one or more surfaces for which positional or angular information within a predetermined coordinate system is desired can be measured without departing from the scope of the invention as defined by the claims.

In an exemplary aspect device 200 may be integrated into a manufacturing line or system. For example device 200 may be used as a station of a head suspension assembly manufacturing system. In some of these systems, head suspensions are provided on a carrier strip and are moved from station to station by advancing the carrier strip in a processing direction. Device 200 can be integrated with such a system so that a head suspension or head suspension assembly carried by a carrier strip can be positioned in the measurement position 206 of the device 200. Device 200 can be used to measure static attitude in accordance with the invention. A static attitude measurement can then be used to adjust static attitude, if desired. Also, head suspensions or head suspension assemblies can be provided to the measurement position 206 individually (not as part of a carrier strip) by using a fixture, carrier, or tray that can be presented to the measurement position 206 such as by using an automated device or mechanism. Workpiece holder 208 can be designed based upon such systems and may include elements for accurate placement and positioning of such head suspensions or head suspension assemblies.

Figure 6:
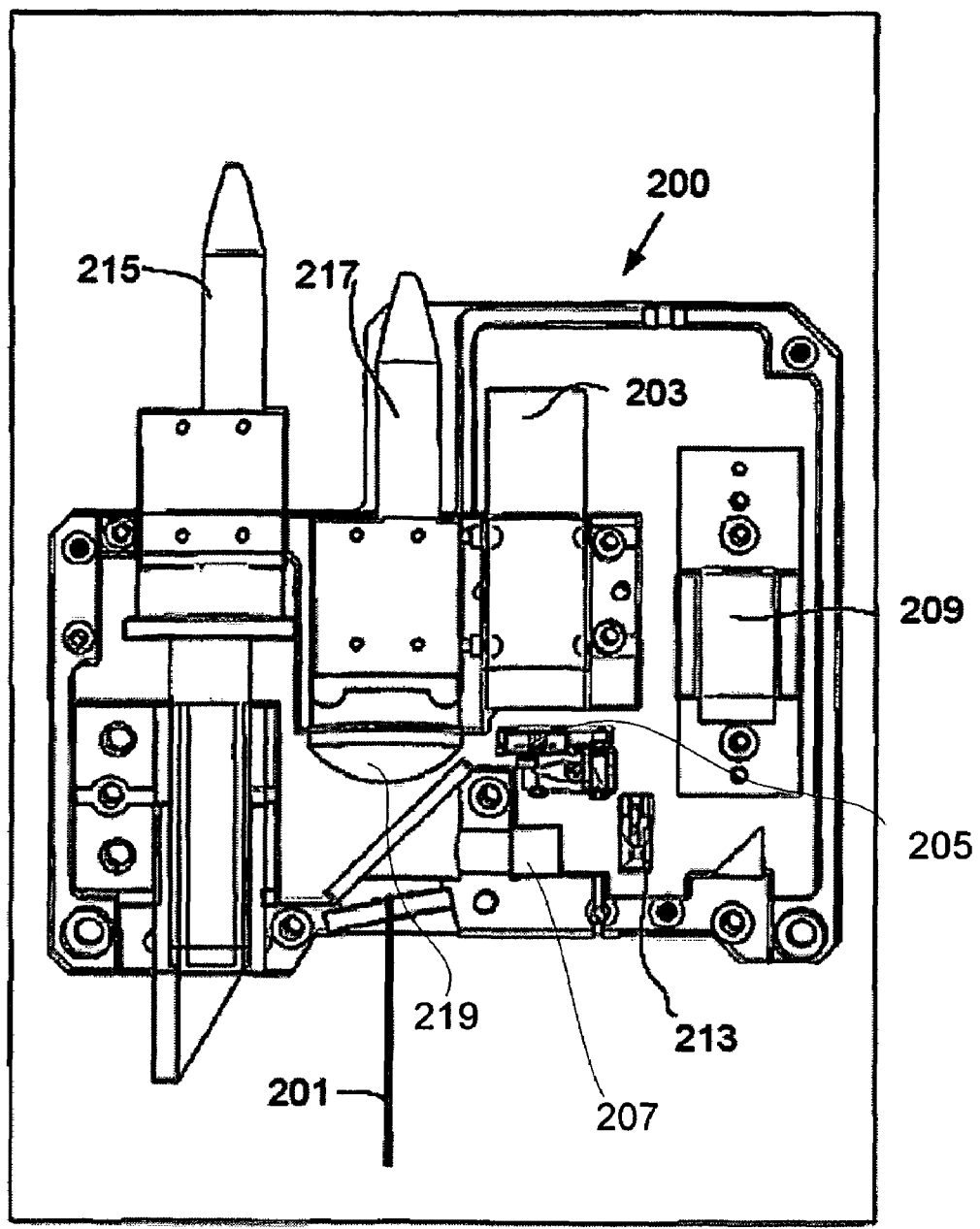
FIG. 6 is a plan internal cross sectional view of the optical measurement device of FIG. 4 having collocated measurement beams.
Figure 7:
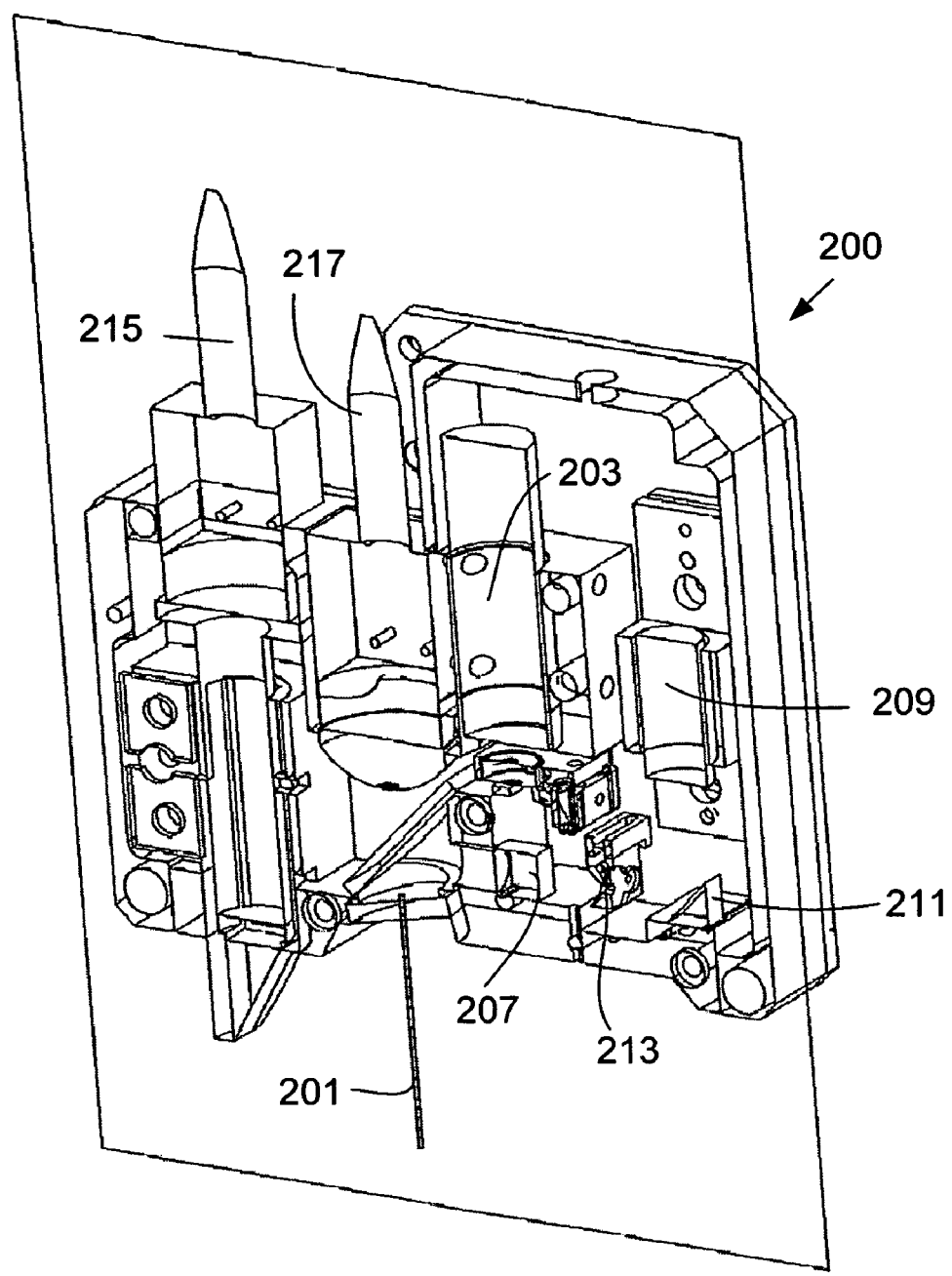
FIG. 7 is a perspective internal cross sectional view of the optical measurement device of FIG. 6 having collocated measurement beams.

As depicted in FIGS. 4 and 5, device 200 generally includes a housing 210 that encloses internal functional components of device 200, which are described in more detail below. In FIGS. 6 and 7, exemplary plan and perspective cross sectional views of device 200 are depicted with a cross sectional cut so that such internal components of the device may be easily viewed. Specifically, a front plan view is depicted in FIG. 6, and a perspective view is depicted in FIG. 7. It is noted that device 200 preferably includes internal mounting structure for mounting and positioning such internal components of device 200 relative to each other in a functional manner in accordance with an exemplary embodiment. Some of the mounting structure may not be illustrated in order to more clearly illustrate the functional aspects and interrelationship of the internal components of device 200. Further, it should be appreciated that many other spatial configurations, combinations of components and mechanical configurations may be used without departing from the scope of the invention as defined by the claims. However, the internal components of device 200 are generally shown in a preferred spatial arrangement with regard to each other. Also, exemplary device 200 is preferably designed to provide a compact, space-efficient device and the internal components of device 200 are depicted in an arrangement to provide such a compact and functional device. It is noted, however, that the internal components of device 200 can be spatially arranged in any functional manner in accordance with alternative exemplary embodiments. For example, the internal components of device 200 do not need to be provided in housing 210 as depicted in FIG. 4, but may be arranged supported on a board with no or a partial exterior housing.

Referring to FIGS. 4 and 5 generally, device 200 produces a laser beam 201. Laser beam 201 comprises more than one distinct laser beam having multiple components of light. For example, laser beam 201 may comprise more than one different wavelength laser beams. In an exemplary embodiment, laser beam 201 comprises red and green laser beams which are collocated to the same spot. In an exemplary embodiment, the green laser is generated by a green laser diode 203. The green laser beam is delivered as part of beam 201 through reflective and/or refractive optics including but not limited to a lens 205 and a beam splitter 207. Many other and various configurations for the delivery of laser light may be derived without departing from the scope of the invention.

In a similar manner, a red laser beam is generated with a red laser diode, which is used to generate a red laser beam and deliver the red laser beam to a prism 211, through an adjustable aperture 213 and to beam splitter 207 where it is combined with the green laser beam. Adjustable aperture 213 may be used to provide a user selectable angle spot size to help in optimizing the measurement capabilities. In a particular exemplary embodiment, the spot size may range from approximately 0.1 to 1.0 millimeters (MM). Again, other refractive and/or reflective optics may be applied without departing from the scope of the claimed invention. For example, a focused beam may be used instead of, or in combination with aperture 213. Further, it may be desirable to design such a system so that the lens, the aperture, or both are movable in order to optimize the spot size.

It is noted, however, that any functionally equivalent optical components and/or system(s) that can provide a plurality of measurement beams that are co-located in accordance with the invention may be used. For example, beam splitters, plural diffraction optics devices, and plural lasers can be used.

A particular advantage of the invention is that because of the ability to collocate the two different laser beams, both beams are able to be delivered normal to the surface 202 of workpiece 204, which may improve accuracy and signal to noise ratios in particular for angle measurements.

Composite laser beam 201 may be used to illuminate a spot on surface 202 of workpiece 204. Accordingly, measurements based on the reflection of laser light from the spot may be made by detection of the reflected light. In accordance with an exemplary embodiment, detection of the reflected light is carried out by a first imaging system 215 and an autocollimator 217. First imaging system 215 may include detectors which are sensitive to a specific wavelength range of light while second imaging system 217 may include detectors which are sensitive to a specific wavelength range of light that is different than the range detectable by first imaging system 215. For example, imaging system 215 may be tuned to detect the green laser light and autocollimator 217 may be tuned to detect the red laser light which is provided through aspheric lens 219 such that the sensor or detector for the autocollimator is positioned at the focal point of the lens. Autocollimators, such as autocollimator 217, are generally used to measure the relative planar orientation of the workpiece surface and have been described in U.S. Pat. No. 7,027,141, filed on May 3, 2002, issued on Apr. 11, 2006, to Mark Girard, and is herein incorporated by reference.

In accordance with an exemplary embodiment, first imaging system 215 may be used to determine the Z-height measurement by detecting the finely focused green laser beam. Similarly, autocollimator 217 may be used to determine the angle (pitch and roll) measurement by detecting the adjustable aperture red laser beam. Imaging system 215 and autocollimator 217 both comprise cameras which are capable of detecting the position of the received laser beam. Such a camera may be, but is not limited to including a charge coupled device (CCD), a complementary metal oxide semiconductor (CMOS) device or other detecting devices which are capable of sensing the position of an image formed on the device to function in a similar manner as described in relation to detectors 18, 66, and 70 in FIGS. 1 and 2. In a particular exemplary embodiment the imaging systems 215 and 217 may use ½-inch CCD arrays.

In an exemplary embodiment one way of making each camera or imaging system sensitive to a specific wavelength range is through the use of filtering, either optical or electronic. Optical filtering may use optical elements to attenuate one wavelength of light over another. Another way to filter is through electronic filtering techniques in which all wavelengths are received and through signal processing techniques, reception of a particular wavelength is determined. Further, other combinations of optical and electronic filtering may be used without departing from the scope of the claimed invention.

Another feature of an exemplary embodiment is that it is possible to perform all measurements substantially simultaneously. That is, the pitch static attitude (PSA), the roll static attitude (RSA) and the Z height measurements may all be carried out substantially simultaneously with a measurement speed of approximately 35 milliseconds (msec).

While the detailed drawings, specific examples, and particular formulations given described exemplary embodiments, they serve the purpose of illustration only. It should be understood that various alternatives to the embodiments of the invention described may be employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. An optical measurement device for determining at least two parameters of a measurement location of a surface of a workpiece positioned in a known coordinate system by a workpiece support, comprising:
   a first laser light source providing a first measurement beam at a first wavelength;
   a second laser light source providing a second measurement beam at a second wavelength;
   a beam steering system positioning the first and second measurement beams to be collocated together as a defined spot at the same time on the surface of the workpiece and substantially normally incident on the workpiece;
   a first imaging system, detecting the Z-height of the workpiece based upon the incoming position of the spot of the first wavelength light of the first measurement beam; and
   an optical receiving system, detecting the angle of the surface of the workpiece based upon the incoming position of the spot of the second wavelength light of the second measurement beam, wherein the first imaging system and the optical receiving system simultaneously detect the first and second measurement beams, respectively.

2. The optical measurement device of claim 1, wherein the beam steering system comprises refractive optical elements.

3. The optical measurement device of claim 1, wherein the beam steering system comprises reflective optical elements.

4. The optical measurement device of claim 1, wherein the first light source comprises a green laser.

5. The optical measurement device of claim 1, wherein the second light source comprises a red laser.

6. The optical measurement device of claim 1, wherein the first imaging system comprises a charge coupled device (CCD).

7. The optical measurement device of claim 1, wherein the optical receiving system comprises an autocollimator.

8. The optical measurement device of claim 1, wherein the first imaging system detects Static Attitude.

9. A method of determining at least two parameters of a measurement location of a surface of a workpiece positioned in a known coordinate system by a workpiece support, comprising:
   providing a first measurement laser beam at a first wavelength;
   providing a second measurement laser beam at a second wavelength while providing the first measurement beam;
   positioning the first and second measurement beams to be collocated together as a defined spot on the surface of the workpiece and the first and second measurement beams impinging on the surface of the workpiece at substantially the same angle and at the same time;
   detecting the Z-height of the workpiece based upon the incoming position of the spot of the first wavelength light of the first measurement beam; and
   detecting the angle of the surface of the workpiece based upon the incoming position of the spot of the second wavelength light of the second measurement beam.

10. The method of claim 9, wherein the positioning is carried out by use of optical elements.

11. The method of claim 9, wherein the first measurement beam is a green laser.

12. The method of claim 9, wherein the second measurement beam is a red laser.

13. The method of claim 9, wherein the position of the first incoming beam is representative of static attitude.

14. The method of claim 9, wherein the first and second measurement beams are positioned to be substantially normal to the surface of the workpiece.

15. The method of claim 9, further comprising:
adjusting an aperture through which the second measurement beam is directed.

16. The method of claim 9, further comprising:
moving the workpiece so that a new location is illuminated by the measurement beams.

17. The method of claim 9, wherein the beams are detected by optical receiving devices.

18. The optical measurement device of claim 1, wherein the first imaging system detects Z-height.

19. The method of claim 9, wherein the position of the first incoming beam is representative of Z-height.

* * * * *

UNITED STATES PATENT AND TRADEMARK OFFICE
CERTIFICATE OF CORRECTION

PATENT NO. : 7,656,540 B2 Page 1 of 1
APPLICATION NO. : 11/634813
DATED : February 2, 2010
INVENTOR(S) : Mark T. Girard It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 86 days.

Signed and Sealed this

Twenty-eighth Day of December, 2010

David J. Kappos
*Director of the United States Patent and Trademark Office*